United States Patent
Hockley, Jr. et al.

(10) Patent No.: US 7,084,809 B2
(45) Date of Patent: Aug. 1, 2006

(54) APPARATUS AND METHOD OF POSITION DETERMINATION USING SHARED INFORMATION

(75) Inventors: George O. Hockley, Jr., Campbell, CA (US); Leonid Sheynblat, Hillsborough, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 10/335,753

(22) Filed: Jan. 2, 2003

(65) Prior Publication Data

US 2004/0008138 A1    Jan. 15, 2004

Related U.S. Application Data

(60) Provisional application No. 60/396,344, filed on Jul. 15, 2002.

(51) Int. Cl.
*G01S 5/14* (2006.01)
(52) U.S. Cl. .............................. 342/357.08; 342/357.09
(58) Field of Classification Search ........... 342/357.08, 342/357.06, 357.09, 357.07; 701/213
See application file for complete search history.

(56) References Cited

U.S. PATENT DOCUMENTS

| | | | |
|---|---|---|---|
| 5,708,440 A * | 1/1998 | Trimble et al. | 342/357.06 |
| 5,926,765 A | 7/1999 | Sasaki | 455/456 |
| 6,031,490 A | 2/2000 | Forssen et al. | 342/457 |
| 6,266,014 B1 | 7/2001 | Fattouche et al. | 342/450 |
| 6,442,484 B1 * | 8/2002 | Miller et al. | 701/301 |

FOREIGN PATENT DOCUMENTS

| | | |
|---|---|---|
| GB | 2359699 A | 8/2001 |
| WO | WO 99/63358 A1 * | 12/1999 |
| WO | WO 01/96898 A2 * | 12/2001 |
| WO | WO 02/25309 A1 * | 3/2002 |

OTHER PUBLICATIONS

Sanchez, Ricardo et al, "RDRN: A Prototype for a Rapidly Deployable Radio Network," ACM Mobile COmputing and Communications Review, vol. 2, No. 2, 1998, pp. 1-8.*

* cited by examiner

*Primary Examiner*—Gregory C. Issing
(74) *Attorney, Agent, or Firm*—Philip Wadsworth; Bruce W. Greenhaus; Andrea L. Mays

(57) ABSTRACT

A hybrid position determination system is disclosed. A mobile device may determine a number of pseudo ranges based on a first position determination system, such as a Global Positioning System. In instances where the position of the mobile device is underdetermined because of an insufficient number of satellite pseudo ranges, the mobile device shares position information with other devices. The other devices may include other mobile devices. A first mobile device may determine its position based on an underdetermined number of satellite pseudo ranges by determining pseudo ranges to other mobile devices. In other embodiments, the number of satellite pseudo ranges may be insufficient to generate an absolute position determination of a single mobile device. In this underdetermined condition, mobile devices may determine a common location of the group or may determine a relative positioning of members of the group.

32 Claims, 10 Drawing Sheets

400

700

APPARATUS AND METHOD OF POSITION DETERMINATION USING SHARED INFORMATION

RELATED APPLICATION

This applications claims priority to U.S. Provisional Application Ser. No. 60/396,344, filed on Jul. 15, 2002.

BACKGROUND OF THE INVENTION

1. Field of the Invention

The current invention relates to the field of position determination. More particularly, the invention relates to position determination using information received from multiple sources.

2. Description of the Related Art

Wireless position determination systems are used to determine the location of a device. Often, the device is a mobile or portable device that may operate from battery power, and the device may not be tethered to any stationary location by a wired communications link.

There are a number of design concerns in a wireless position determination system. Position location accuracy is, of course, one of the concerns. System sensitivity, acquisition time, and power dissipation are also design concerns that are addressed in a position determination system. Wireless position determination systems typically incorporate a trade-off of design constraints in an attempt to obtain a relative optimization of each of the system concerns.

As wireless communication systems become more popular, the desire to incorporate some type of position location capability has emerged. In a wireless communication system, such as a wireless telephone system, it may be desirable to be able to locate the position of a mobile device such as a wireless telephone handset. Indeed; in the United States, enhanced emergency wireless service having the capability of determining the location of a handset has been mandated for wireless phone providers. Wireless service providers, in conjunction with equipment manufacturers, have devised a variety of position location systems that are able to provide the location of a mobile device, such as a portable handset. Each of these location systems emphasizes different system concerns and works by differing mechanisms.

One position location system that may be utilized by a mobile device is the Global Positioning System (GPS). In the Global Positioning System, there are approximately twenty-four satellites that orbit the earth. Each of the satellites transmits a carrier frequency that is modulated with a pseudo random noise (PRN) code sequence. The PRN code that is commonly used by civilian based GPS receivers is termed the Coarse Acquisition (C/A) code. Each satellite transmits a different PRN code. In the GPS, a GPS receiver receives the signals from multiple satellites and determines the distance from each satellite in order to trilaterate the position of the receiving device.

As an example, a receiver that is approximately synchronized to GPS time receives a signal from a first GPS satellite and demodulates the received carrier frequency to obtain the PRN code. The receiver determines a pseudo range, or uncorrected distance measurement, to the first satellite by correlating an internally generated PRN code to the received PRN code. The pseudo range thus defines a surface of a sphere centered at the satellite. The receiver determines its location by determining pseudo ranges to other satellites and calculating the intersection of the corresponding sphere surfaces.

Although the accuracy of GPS position location is excellent for purposes of locating a handset, the time to acquire a first position fix may be long, varying up to several minutes. Additionally, the ability to receive signals from a plurality of satellites is impeded in environments where the signals from satellites may be occluded by the presence of tall structures or overhead foliage. As is known, a GPS receiver typically must receive signals from at least four satellites in order to determine its position accurately.

Another position location system that may be used by wireless phones is based on Cell-ID. Wireless phones register with the wireless system such that the wireless system knows with which base station the wireless phone is communicating with. Additionally, some base stations may be sectorized and the wireless system is able to identify a particular sector of the base station the phone is communicating with. The position of a wireless phone may then be determined according to the cell or sector in which the wireless phone is registered or communicating with. This type of position location service may be inherent within many types of wireless systems, but unfortunately only provides a very coarse position location that varies according to the size of the cell.

Another position location system that may be used by wireless devices is Enhanced Observed Time Difference (E-OTD). E-OTD is a position location system that is optimized for use in Global System for Mobile communications (GSM) and General Packet Radio Service (GPRS) wireless communication systems. In this system, the mobile device monitors transmission bursts from multiple base stations and measures the time shifts between the arrival of frames in order to determine its position. The mobile device must receive signals from at least three base stations in order to make a position determination. However, the E-OTD system requires the use of Location Measurement Units (LMUs) strategically placed throughout the network in order to provide the system with the precise timing required to make the position location relatively accurate. Additionally, position determination may not be possible in some service areas because the mobile device cannot communicate with at least three base stations.

Another position location system that may be used by wireless phones is Observed Time Difference of Arrival (OTDOA). OTDOA is a position location system that is optimized for use in Wideband Code Division Multiple Access (WCDMA) systems. The OTDOA position location system operates similar to the E-OTD system. The location of a mobile device is estimated by determining the time difference of arrival of communication signals from multiple base stations. In addition to requiring timing units similar to the LMUs required in the E-OTD system, the problems associated with not communicating with a sufficient number of base stations are further aggravated by the use of WCDMA, which utilizes power control. Power control minimizes the transmit power required to achieve a desired quality of service. Because transmit power from the base station is minimized, the probability that the mobile device is communicating with the necessary three base stations is reduced.

Still another position location system that may be used by wireless phones is wireless Assisted GPS (A-GPS). In A-GPS, signals from GPS satellites, as well as signals received from base stations in the wireless system, are used for position location. An A-GPS may be configured to operate in a system where the mobile device acquires satellite (and other timing information), calculates pseudo ranges corresponding to the timing information, and sends the pseudo range information to an A-GPS location server where the actual position of the mobile device is determined. In an alternative configuration, the mobile device performs the position determination itself without using the location server. In both alternatives, a location server may be used to provide aiding data to the mobile device to assist in the acquisition of satellite signals. The aiding data greatly reduces the time required to compute a first fix because the search performed by the mobile device may be bounded by the aiding data and the need to receive and demodulate satellite navigation data is eliminated.

Still other position location systems may use a combination of position location systems. Hybrid position location systems typically incorporate signals from at least two different position location sub-systems in order to determine the location of a mobile device. The received signals may be used mutually exclusively or may be used in combination when making the position determination.

A-GPS may be viewed as a hybrid position location system using information from both a location server as well as GPS satellite information. Still other position location systems may use GPS satellite signals in addition to timing and pseudo range information derived from wireless base station signals. For example, U.S. Pat. No. 5,999,124, by Sheynblat, entitled "SATELLITE POSITIONING SYSTEM AUGMENTATION WITH WIRELESS COMMUNICATION SIGNALS" discloses a system in which the position of a receiver is determined from a combination of position information from a satellite system and from a wireless communication system. In other position location systems, time of arrival information from a first position location sub-system may be used in conjunction with cell ID information from a wireless communication system used as a second position location sub-system.

However, aside from GPS, each of the above mentioned position determination systems requires a mobile device to be in communication with a fixed position determination sub-system. Many of the position determination systems require the mobile device to be part of a wireless phone system. Not all mobile devices are part of wireless phone systems. For example, wireless communication systems may comprise a number of two-way radios, or other independent mobile devices. The mobile devices in some systems may communicate directly with each other as well as to a fixed base station. It would be advantageous to allow each of the mobile devices in such a wireless communication system to determine its position. However, as noted earlier, use of GPS alone may not provide a satisfactory solution. There may be a low probability of receiving a sufficient number of satellite signals, especially in an urban environment where buildings and other man-made or natural structures often occlude the satellite signals. For these reasons, what is needed is a system that provides a wireless device with accurate position information, but does not require the device to directly communicate with the minimum number of satellites to independently determine its position.

SUMMARY OF THE INVENTION

A device and method are disclosed for determining a position of a mobile device. A mobile device may determine its position by determining partial position information from signals received from a first source. The mobile device also receives shared information from a second source or a plurality of additional sources. The mobile device determines additional position information from the shared information and determines its position based at least in part on the position information and the additional position information.

The partial position information may be ranges or pseudo ranges to objects having known locations. The objects may be GPS or other satellites, wireless communication base stations, or other mobile devices. The shared information may come from a second mobile device, such as a wireless phone, or may come from a plurality of other devices, some of which may be mobile and others of which may be at fixed locations. The shared information may include, for example, ranging signals, timing information, GPS pseudo ranges, position information of the transmitting device, or a range to the transmitting device.

The position of the mobile device may be determined by the mobile device or may be determined at a location remote from the mobile device. When the mobile device determines the position, the position may be determined by a processor within the mobile device or may be determined by a position determination module within the mobile device. When the position is determined at a remote location, the position may be determined in a network in communication with the mobile device. The position of the mobile device may be determined in a location server that is part of the network.

The position of the mobile device may be determined to be an absolute position or may be determined to be a relative position. The position of the mobile device may be determined to be a common position of a local group with which the mobile device is a member. The relative position may be a position relative to members of a local group with which the mobile device is a member.

BRIEF DESCRIPTION OF THE DRAWINGS

The features, objects, and advantages of the invention will become more apparent from the detailed description set forth below when taken in conjunction with the drawings in which like reference characters identify correspondingly throughout and wherein.

DETAILED DESCRIPTION OF EMBODIMENTS OF THE INVENTION

Figure 1:
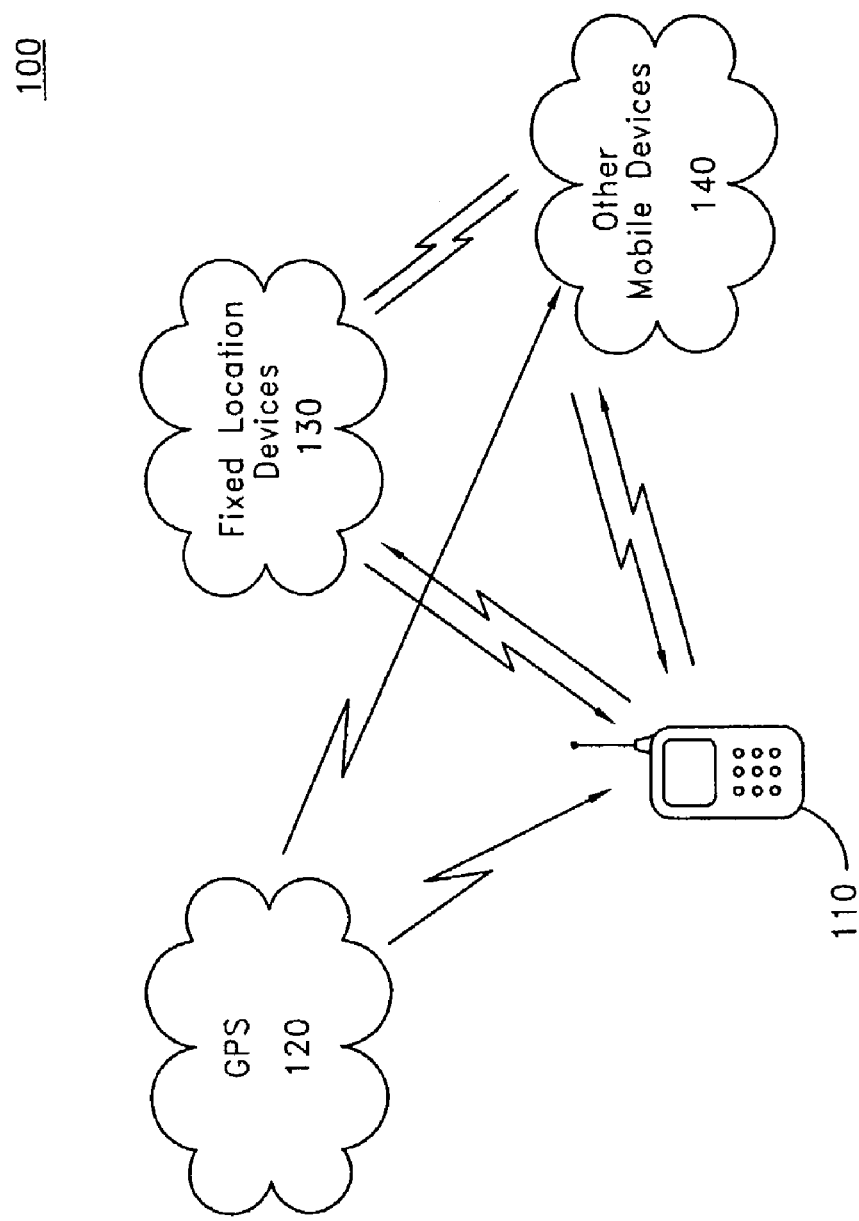
FIG. 1 is a functional diagram of one embodiment of a hybrid position determination system.

Embodiments of the invention relate to systems and methods for accurately determining the geographic position of a mobile device, such as a cellular telephone. In one embodiment, a cellular telephone is equipped with a position determination module that utilizes positional information gathered from GPS satellites and other cellular telephones to accurately determine its geographic position. The system described herein is useful in circumstances wherein a user of a cellular telephone might only be in a position to receive partial positional information, such as when the telephone can only receive ranging signals from three or less GPS satellites. In this circumstance, only an approximate geographic position can be determined. In order to overcome the positional inaccuracy when signals from only three or fewer GPS satellites can be received, embodiments of the system utilize positional information received from other mobile devices to determine an accurate geographic position for a cellular telephone. Of course, the systems described herein are not limited to only cellular telephones. Other portable devices, such as pagers, wireless personal digital assistants, and any other mobile wireless device that embodies the systems and methods described herein are within the scope of the invention.

While the disclosure provides several examples of systems that supplement partial positional information by receiving additional positional information from a mobile device, the system is not limited to only these particular embodiments. Any embodiment which includes supplementing partial positional information within positional information received from a mobile device is contemplated within the scope of the invention.

As used herein, the "geographic position" or "absolute position" of a device is intended to mean the accurate position of that device in a coordinate system, with only a small margin of error. In one example, the geographic position or absolute position of a device is its longitude and latitude on the earth. For example, geographic position or absolute position of a device might be accurate to within several meters of the actual location of the device on the earth.

As used herein, the term "partial position" or "partial position information" refers to positional information that by itself does not provide sufficient information to make an absolute position determination. Position determination is typically not made using the partial position information because the result would typically be inadequate and unreliable. For example, the pseudo ranges from a receiver to two GPS satellites comprise partial position information because the receiver is unable to determine an absolute position based on just the two satellite pseudo ranges. The partial position information may be combined with other partial position information or other additional position information to determine an absolute position of the receiver. Continuing with the same example, the receiver can typically make an absolute position determination if it can determine pseudo ranges to four GPS satellites. In addition to the partial position information comprising the first two satellite pseudo ranges, the receiver may also be able to determine pseudo ranges corresponding to two additional GPS satellites different from the first two GPS satellites.

One embodiment of a hybrid position determination system disclosed herein allows a mobile device to accurately determine its geographic position based on information received from a GPS position determination system as well as information received from other mobile devices. The system is useful because a mobile device may not have a sufficient number of GPS satellites to determine its position, or "fix" as it is commonly referred. The mobile device may supplement the GPS information with information received from other mobile devices. The information received from other mobile devices may include timing information, other GPS satellite information, or information that the receiving mobile device can use to generate ranges to the transmitting mobile device.

A mobile device may determine partial position information using signals received from a first source such as GPS satellites. The mobile device may also receive signals from a second source, such as other mobile devices. The mobile device determines additional position information using the signals from the second source. The mobile device then determines its accurate geographic position using the partial position information in combination with the additional position information.

Embodiments of mobile devices utilizing the system may be able to determine an absolute position or position relative to the other mobile devices. The mobile device's ability to determine an absolute or relative position depends in part on the number of GPS satellites for which the mobile device can determine a pseudo range, and the quality and quantity of information provided by other mobile devices.

A functional block diagram of one embodiment of a hybrid position determination system 100 is shown in FIG. 1. A mobile device 110 is in communication with a number of other devices. The mobile device 110 is configured to receive signals from a Global Positioning System (GPS) 120. The mobile device 110 is also configured to be in communication with fixed location devices 130. The mobile device 110 may receive signals from the fixed location devices 130 and may also transmit signals to the fixed location devices 130. One example of a fixed location device is a base station in a wireless communication system. The mobile device 110 may also be in communication with other mobile devices 140. The mobile device 110 typically can transmit signals to, and receive signals from, the other mobile devices 140. The other mobile devices 140 typically also receive signals from the GPS 120 satellites. Additionally, the other mobile devices 140 may be in communication with the fixed location devices 130.

In order to determine its position location, the mobile device 110 may only communicate with some, and need not communicate with all, of the other devices shown in the hybrid position location system 100. In one embodiment, the mobile device receives signals from GPS 120 satellites and can determine its absolute position if it is able to receive and determine pseudo ranges from a minimum number of GPS satellites. Typically, the minimum number of pseudo ranges to GPS satellites is four. Thus, if the mobile device 110 is able to receive and determine pseudo ranges from at least four well-positioned GPS 120 satellites, the mobile device 110 does not need any information from either fixed location devices 130 or other mobile devices 140 in order to determine its position.

However, if the mobile device 110 cannot determine ranges from a minimum number of GPS satellites, it may receive signals from GPS 120 satellites as well as from fixed location devices 130. The fixed location devices 130 may include beacons, Location Measurement Units (LMU), wireless phone base stations, and wireless communication base stations or base units. In this embodiment, the mobile device 110 does not need to be in communication with the minimum number of GPS 120 satellites. Information from the fixed location devices 130 is used to determine the position of the mobile device 10. Some of the methods of mobile determination using GPS 120 aided by fixed location devices are discussed earlier.

In still another embodiment, the mobile device receives signals from the GPS 120 satellites and also from other mobile devices 140. The other mobile devices 140 may or may not be in communication with the GPS 120 or the fixed location devices 130. The mobile device 110 is able to determine its position using the GPS 120 satellite signals in conjunction with the signals from the other mobile devices 140. The ability of the mobile device 110 to determine its position location depends on a variety of factors, including but not limited to, the number of GPS 120 satellites for which signals may be received, the number of other mobile devices 140 for which communication may be received, and the ability of each of the other mobile devices 140 to know its position. The embodiments discussed below illustrate some of the various alternatives that are within the scope of the invention. No communication with the fixed location devices 130 is required. Thus, inclusion of the fixed location devices 130 in the hybrid position determination system 100 is optional for the embodiment described below.

Similarly, the mobile device 110 may determine its position using information received from the fixed location devices 130 and the other mobile devices 140. In this embodiment, inclusion of GPS 120 in the hybrid position determination system 100 is optional. Various position location systems using shared information by a mobile device 110 are described in further detail below.

Figure 2:
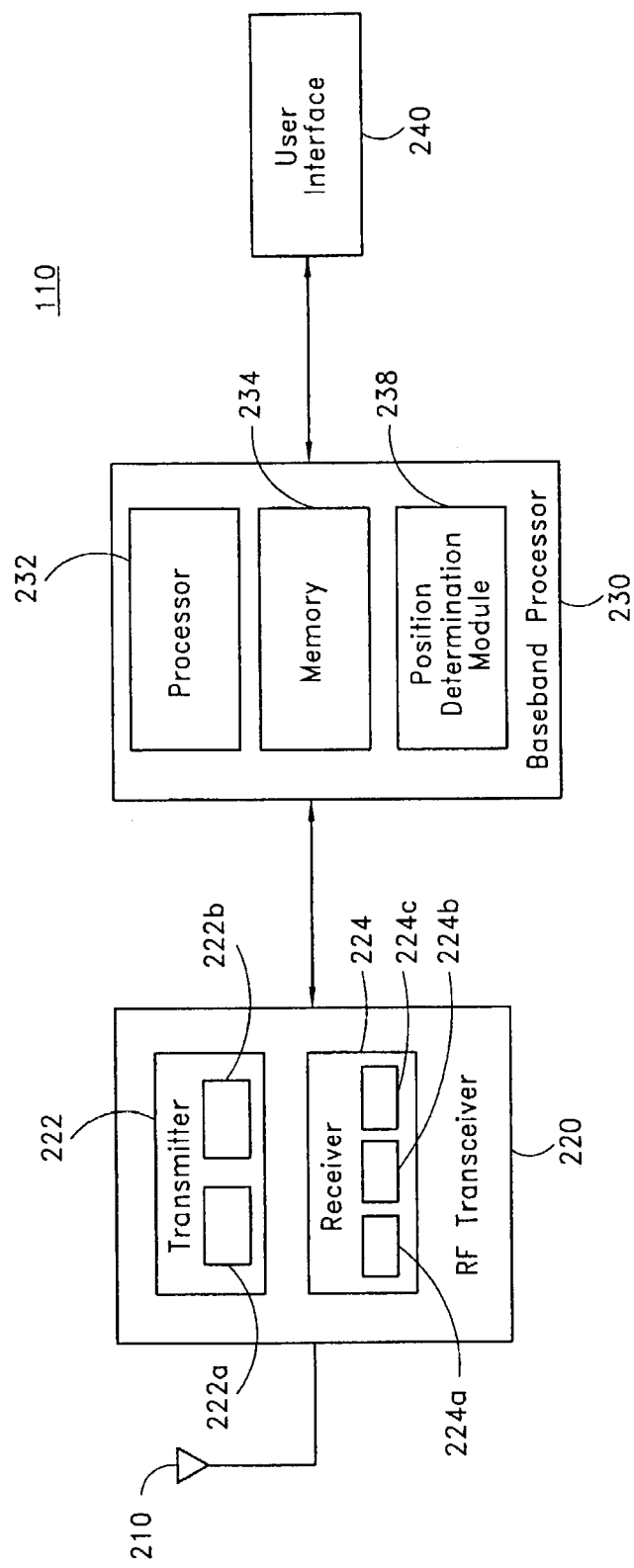
FIG. 2 is a functional block diagram of a mobile device configured to provide position determination according to one of the methods disclosed herein.

FIG. 2 is a functional block diagram of one embodiment of the mobile device 110 such as may be used in the position location embodiments described herein. The mobile device 110 may be any type of wireless device, such as a wireless telephone, including cordless telephones, cellular telephones, Personal Communication System (PCS) telephones, or another type of wireless telephone. The mobile device 110 may also be a two-way radio, such as a walkie-talkie, or other type of communications transceiver. The mobile device 110 may also include circuits to receive and/or transmit Bluetooth, 802.11, or other types of wireless signals.

The mobile device 110 may be conveniently described as having three basic functional blocks, an RF transceiver 220, a baseband processor 230, and a user interface 240. An antenna 210 may be used as the interface between a wireless channel and the remaining blocks of the mobile device 110. Although only one antenna 210 is shown, a mobile device may implement more than one antenna. When more than one antenna is used, each antenna may operate in a distinct frequency spectrum, or the multiple antennas may operate in overlapping frequency spectrums. Where the wireless channel is not a Radio Frequency (RF) link, the interface may be some other type of device, such as an electromechanical transducer or an optical interface.

Signals received by the mobile device 110 are coupled from the antenna 210 to the RF transceiver 220. In a complementary fashion, signals to be transmitted by the mobile device 110 are coupled from the RF transceiver to the antenna 210.

The RF transceiver 220 comprises a transmitter 222 and a receiver 224. Signals received by the mobile device 110 are coupled from the antenna 210 to the receiver 224 within the RF transceiver 224. The receiver 220 typically filters, amplifies, and downconverts the received signal to a received baseband signal having a desired bandwidth and amplitude. The receiver 224 may also perform demodulation of the received RF signal. The receiver 224 may be capable of processing signals from a plurality of frequency bands. For example, the receiver 224 may receive signals from a GPS band as well as from a secondary communication band. If the receiver 224 is designed to receive signals from a plurality of frequency bands, the receiver 224 may implement a plurality of receive paths. Alternatively, the receiver 224 may comprise a plurality of receivers 224a–224c. Each of the receivers, 224a–224c, may independently filter, amplify, downconvert, and demodulate one of the plurality of received signals. For example, a first receiver 224a may be configured to filter, amplify, and downconvert signals received from GPS satellites. A second receiver 224b may be configured to receive communication signals from a wireless phone system and process them into baseband signals to be used in the baseband processor 230. A third receiver 224c may be configured to receive position determination signals from a source other than GPS satellites. These other sources may be, for example, Location Measurement Units, terrestrial beacons, or other mobile devices. The third receiver 224c may then process the received signals into baseband signals to be used by the baseband processor 230. The received baseband signal is then coupled from the RF transceiver 220 to the baseband processor 230. If there are more than one receiver or more than one receive path, the baseband signals from each receiver or receive path are coupled to the baseband processor 230. The baseband signals may be combined into a single path, multiplexed on a single path, or provided on one or more distinct paths to the baseband processor 230.

Baseband signals that are to be transmitted are coupled from the baseband processor 230 to the transmitter 222 within the RF transceiver 220. The transmitter 222 preferably filters, amplifies, and upconverts the transmit baseband signals into transmit RF signals that are coupled to the antenna 210. The transmitter 222 may also modulate an RF signal with the transmit baseband signal. The transmit RF signals are then broadcast over the RF channel to their destination. The intended destination may be a single device or may be a plurality of devices. Additionally, one or more baseband signals may be upconverted to one or more RF frequency bands for transmission. The multiple RF frequency bands may be distinct or may overlap. As was the case with the receiver 224, the transmitter 222 may be configured as a plurality of transmitters 222a–222c or a plurality of transmit paths. Each of the transmitters 222a–222c may separately filter, upconvert, and amplify a baseband signal. For example, a first transmitter 222a may receive baseband signals and process those signals for transmission to destination within a wireless phone system, such as a base station. A second transmitter 222b may be configured to transmit a signal configured to allow another mobile device or other receiver to determine a range to the transmitter. For example, the second transmit path may be configured to transmit a baseband signal that is in the form of a PRN code sequence similar to the signals used by GPS satellites. A receiving device, such as another mobile device or a base station, may then use the PRN code sequence to determine a range to the transmitter.

The baseband processor 230 typically operates on both the transmitted and received baseband signals. The baseband processor 230 may also perform functions local to the mobile device 110. These local functions may include receiving and storing phone book entries, manipulating files stored within the mobile device 110, and managing various interfaces to user devices. The baseband processor 230 typically comprises a processor 232 and a memory 234. A series of instructions or program may be stored in the memory 234 that may be read by the processor 232. The instructions or program may direct the processor to perform various signal processing functions, including some or all of the position determination functions.

The baseband processor 230 may further process the received baseband signals. For example, the baseband processor 230 may filter, amplify, demodulate, detect, or correct the received baseband signal. As further examples, the baseband processor 230 may deinterleave the baseband signal, apply correction using forward error correction techniques, or may synchronize the baseband signal to a time reference. The processed received baseband signals may be control signals used by the mobile device 110 or may be signals that are intended for a user of the mobile device 110 such as voice or data signals. The baseband processor 230 may determine the position of the mobile device 110 using received information, or the baseband processor 230 may receive the location of the mobile device 110 as a message from an external source. Alternatively, the baseband processor 230 may perform a portion of the position determination and coordinate the remainder of the position determination process with an external device. The baseband processor 230 may include a position determination module 238 to determine the position of the mobile device 110 using the received information. The baseband processor 230 couples signals intended for the user to a user interface 240.

As an example, the baseband processor 230 may determine the position of the mobile device 110 using information received from GPS satellites. Alternatively, some or all of the position determination may be performed in the position determination module 238. For example the mobile device 110 may initially be able to receive signals from three GPS satellites. The baseband processor 230 may use received GPS signals to determine the pseudo ranges to three GPS satellites. The ranges are pseudo ranges because the range is an uncorrected distance measurement. The mobile device 110 can typically determine its absolute position by receiving a signal from a fourth GPS satellite and determining a pseudo range to the fourth satellite. Because all of the pseudo ranges should intersect at a single point, the location of the mobile device 110, the baseband processor 230 can use the four pseudo ranges to determine the error in the pseudo ranges. The absolute position refers to a particular position, such as a particular latitude and longitude. In contrast, relative position refers to a location relative to a reference point.

In an alternative embodiment, the mobile device 110 receives signals from one or more GPS satellites. The baseband processor 230 determines the pseudo ranges to the satellites. The GPS pseudo ranges may represent partial position information if there are not sufficient numbers of GPS satellites available to determine an absolute position. The mobile device 110 also receives ranging signals from a terrestrial source, such as another mobile device or a fixed location beacon. The baseband processor 230 can also determine the pseudo ranges to these other sources. The baseband processor 230 may then communicate the partial position information from the GPS satellites, and the additional position information from other mobile devices and beacons, to the position determination module 238 within the baseband processor 230. The position determination module 238 may then determine the position of the mobile device 110.

Alternatively, the baseband processor 230 may format each of the pseudo ranges and position information for transmission to an external device. The external device may incorporate a position determination module to determine the position of the mobile device 110. The external device may then transmit the position as a message to the mobile device 110. The external device may, for example be a location server in a wireless communication system. The alternative embodiment where position determination is distributed among the mobile device 110 and an external device may be used to alleviate processing and memory burdens in the mobile device 110. Although the examples describe the majority of functions performed in the baseband processor 230, the baseband processor 230 may use the position determination module 238 for some or all of the position determination functions.

Signals to be transmitted by the mobile device 110 are processed by the baseband processor 230. The baseband processor 230 may format input signals into baseband signals that are then coupled to the RF transceiver 220. The baseband processor 230, for example, may interleave signals, encode signals with forward error correction, filter signals, modulate signals, or otherwise process signals. The signals provided to the baseband processor 230 for transmission may be generated internally by the mobile device 110 or may be coupled to the mobile device 110 using the user interface 240. The baseband processor 230 may generate a PRN code sequence to be transmitted as a ranging signal to other devices. The ranging signal allows the other devices to determine the range to the mobile device 110.

The user interface 240 provides means for transmitting received signals to the user and also provides means for coupling signals from the user to the mobile device 110. The means for coupling the signals to the user may include, but are not limited to, an audio device such as a speaker or other transducer, a display, which may be a character display, segment display, bit mapped display, or indicators, an electrical connection for coupling electrical signals to a corresponding user device, a mechanical device such as a vibration source to indicate an incoming message, or any other suitable means for communicating information from the mobile device 110 to a user or user device. The means for coupling signals from the user to the mobile device 110 may include, but are not limited to, a microphone, a keypad, a touch screen, an electrical connection, an optical input, or any other suitable means for coupling user signals to the mobile device 110.

The operation of the mobile device 110 is explained in more detail with reference to FIGS. 3 through 7. Each of the mobile devices shown in FIGS. 3 through 7 may be a mobile device similar to the one shown in FIG. 2.

Figure 3:
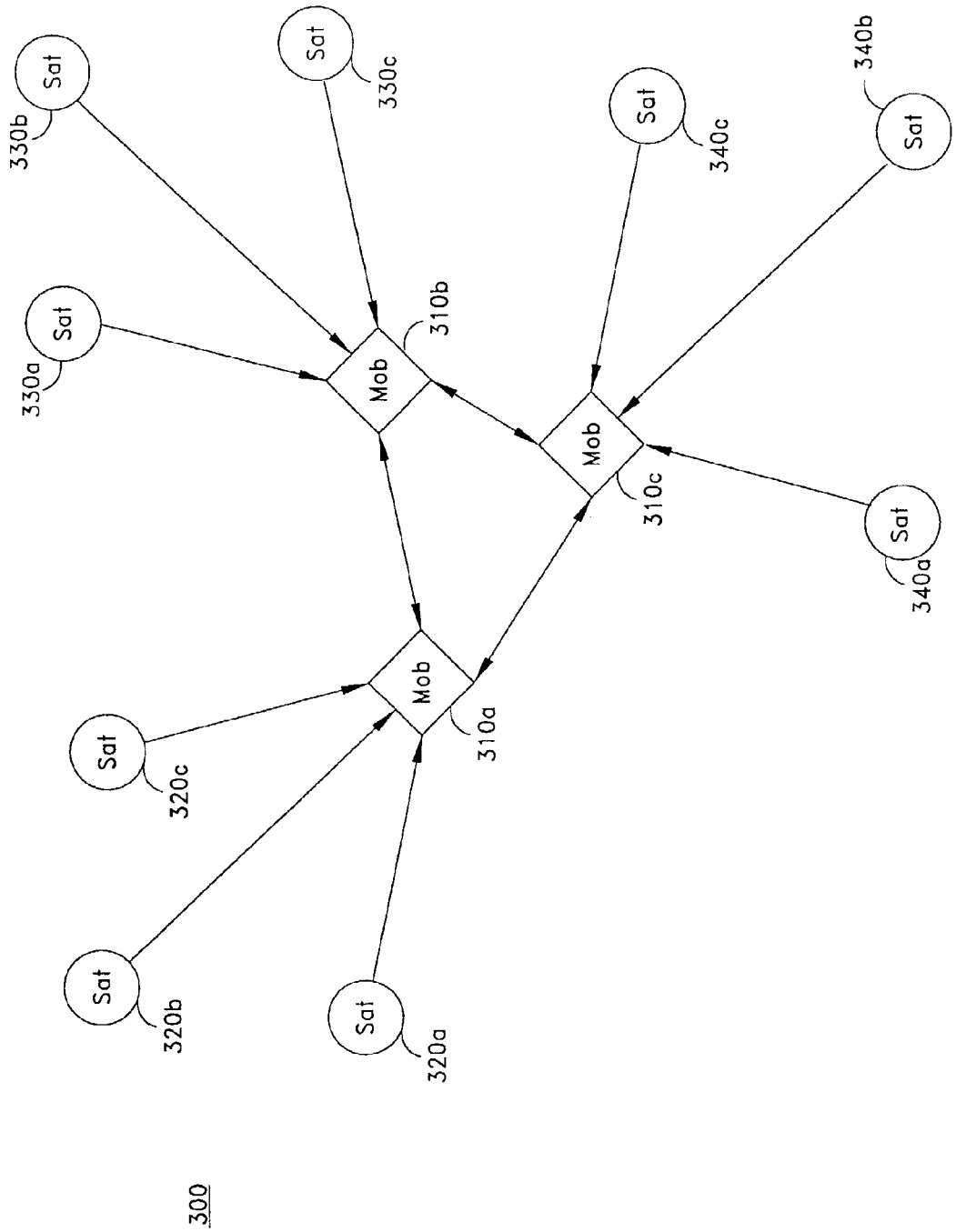
FIG. 3 is a functional diagram of one embodiment of a position determination system showing three mobile devices.

The functional diagram of FIG. 3 shows one embodiment of a position location system. Each of the mobile devices 310a–310c is in communication with three GPS satellites and in communication with each other. Mobile devices 310a–310c that are in communication with each other define a local group.

The mobile devices 310a–310c compensate for an insufficient number of GPS satellites by sharing information with each other. The mobile devices 310a–310c may, for example, share timing information or GPS aiding information. Referring again to FIG. 3, the first mobile device 310a is in communication with three GPS satellites 320a–320c. The first mobile device 310a determines partial position information using the signals received from the GPS satellites 320a–320c. The three GPS satellites 320a–320c are three distinct satellites. The first mobile device 310a is also in communication with a second mobile device 310b and a third mobile device 310c.

The second mobile device 310b is also in communication with three GPS satellites 330a–330c. The three GPS satellites 330a–330c that are in communication with the second mobile device 310b may or may not have satellites in common with the three GPS satellites 320a–320c in communication with the first mobile device 310a.

Similarly, the third mobile device 310c is in communication with three GPS satellites 340a–340c. The three GPS satellites 340a–340c that are in communication with the third mobile device 310c may or may not have satellites in common with the GPS satellites 320a–320c or 330a–330c in communication with the other mobile devices 310a–310b.

Each of the mobile devices 310a–310c may not be able to accurately resolve its position using just the partial position information determined from the GPS satellite transmissions. A mobile device may use three satellite pseudo ranges to resolve its position to two points. Each pseudo range defines a surface of a sphere with the GPS satellite in the center. The intersection of three spheres defines two distinct points. The mobile device may then use hypothesis testing to eliminate one of the two points. For example, in a wireless phone network, a wireless phone may use knowledge of the coverage area of the wireless phone system to eliminate one of the two points. Alternatively, the mobile device may use altitude to eliminate one of the two points, such as points having altitudes greater than the altitude at which commercial aircraft fly.

The inability of a mobile device, for example 310a, to resolve a time reference used by the GPS satellites may contribute to an error when position is determined using only three GPS satellites. However, any of the mobile devices 310a–310c may achieve time synchronization with the GPS satellites in a variety of ways. Once one of the mobile devices, for example 310a, determines GPS timing reference, it may communicate the timing information to all other members of the local group. For example, time synchronization may be achieved during a period of time in which a mobile device receives information from four or more GPS satellites. Additionally, GPS time information may be communicated to one or more of the mobile devices 310a–310c by an external network (not shown) having knowledge of GPS time. An example is a wireless phone that is able to communicate with a base station that has knowledge of GPS time. Alternatively, the mobile device may incorporate a stable oscillator that is synchronized to GPS time. A time period for which the oscillator is considered accurate depends on the stability of the oscillator. A less stable oscillator would require more frequent synchronization with GPS time. The ability of the mobile devices to have knowledge of GPS time increases the accuracy of the position determination.

Initial knowledge of GPS time may not be required for the embodiment of FIG. 3 in many situations because the mobile devices may determine a GPS time reference based on their geometry. Alternatively, the mobile devices may use hypothesis testing to resolve a position fix from a limited set of position fixes. For example, a mobile device in communication with three GPS satellites may be able to determine that its position is one of two positions corresponding to the intersection of three spheres. The mobile device may use shared information among members of the local group and hypothesis testing to determine which of the two points is more likely. For example, the mobile device may review prior absolute position fixes. The prior position fixes may help to evaluate the present position fix depending on the age of the prior position fixes. Alternatively, prior position fixes for other members of the local group may be evaluated and used to help determine the current position fix. Mobile to mobile ranges can then be used to further refine the position fix. Thus, there may be some instances in which a mobile device in the embodiment shown in FIG. 3 requires prior synchronization with GPS time reference in order to determine its absolute fix. However, for a majority of situations, the mobile device may use hypothesis testing to determine its absolute position without prior knowledge of GPS time.

The mobile devices 310a–310c may share information with each other in order to collectively have sufficient information to accurately resolve their individual positions. The shared information may include GPS information, timing information, and may also include ranging signals as well as mobile to mobile range information.

The first mobile device 310a may communicate with the second mobile device 310b in order to obtain additional position information. The second mobile device 310b may communicate to the first mobile device 310a information relating to the satellites 330a–330c from which the second mobile device 310b is receiving transmissions. Additionally, the second mobile device 310b may transmit a ranging signal to the first mobile device 310a that allows the first mobile device 310a to determine a range to the second mobile device 310b.

For example, the second mobile device 310b communicates to the first mobile device 310a the identity of the GPS satellites 330a–330c with which the second mobile device 310b is in communication. The second mobile device 310b also communicates the ranges to each of the GPS satellites 330a–330c. In addition, or alternatively, the second mobile device 310b communicates the uncorrected positions that correspond to the three GPS satellite ranges. The second mobile device 310b also transmits a ranging signal. The ranging signal may be a PRN code sequence modulated onto an RF carrier. Additionally, the second mobile device 310b communicates a message indicating a time reference to the first mobile device 310a.

The first mobile device 310a determines its uncorrected position using the ranges to the three GPS satellites 320a–320b from which it is receiving transmissions. The first mobile device 310a also uses the information from the second mobile device 310b to determine the uncorrected position of the second mobile device 310b. The first mobile device 310a uses the ranging signal transmitted by the second mobile device 310b to determine the range between the two devices. The first mobile device 310a synchronizes with the PRN code sequence transmitted by the second mobile device 310b in order to determine the mobile to mobile range. There is no time synchronization issue between the two mobile devices 310a and 310b because the second mobile device 310b can transmit a time reference signal to the first mobile device 310a. The first mobile device 310a can then synchronize an internal time base to a time base in the second mobile device 310b. Thus, by sharing information with the second mobile device 310b, the first mobile device 310a can determine its uncorrected position, the uncorrected position of the second mobile device 310b, and the range between the two devices. The second mobile device 310b may independently determine the same information or can receive the information from the first mobile device 310b.

Similarly, the third mobile device 310c may communicate to the first mobile device 310a information relating to the satellites 340a–340c from which the third mobile device 310c is receiving transmissions. The third mobile device 310c may also transmit a ranging signal.

Thus, each mobile device 310a–310c in the local group is able to determine the uncorrected position of all members of the local group. Each mobile device 310a–310c can also determine the range to any other member of the local group. The mobile devices 310a–310c can then use this information to determine an absolute position of each of the mobile devices 310a–310c.

The communication between the mobile devices 310a–310c may be direct or may be indirect. The first mobile device 310a may receive transmissions from the second and third mobile devices 310b–310c or the information from the second and third mobile devices 310b–310c may be sent to the first mobile device 310a using another device (not shown) in communication with the mobile devices 310a–310c. The other device may, for example, be a common base station or a central connection point or dispatch station.

Each mobile device 310a–310c may also determine mobile to mobile ranging by using beacon signals that are received by all mobile devices 310a–310c. Each mobile device 310a–310c can determine its range to another mobile device by using a beacon signal transmitted by each mobile device 310a–310c. In another alternative, each mobile device 310a–310c may determine its position relative to the other mobile devices using a combination of mobile to mobile range and angle of arrival.

Thus, each mobile device 310a–310c can determine a range to three GPS satellites as well as ranges to each of the other mobile devices in the local group. The combination of GPS and local group information allows each mobile device to determine its position or fix. The mobile devices 310a–310c typically use a time reference that is synchronized to the time reference used by the GPS satellites in order to minimize the error in the position of the mobile device 310a–310c.

Inter-mobile ranges and satellite ranges that are in different time domains cannot be combined to make an accurate position determination. A mobile device is unable to determine ranges to satellites until a satellite time reference is known. The mobile device can only determine pseudo ranges that are composed of the true geometric range to the satellite plus a range error due to an unknown clock error, or offset. The desired range component cannot be separated from the range error contributed by clock offset without receiving a sufficient number of measurements, which are in the same time domain. Once one of the local group members determines a time reference, the time reference can be shared among all members of the local group. Also, the first local group member is now an absolute position reference, and ranges to it can be used to determine position when combined with other ranges in the same time domain.

Any of the mobile devices 310a–310c may achieve time synchronization with the GPS satellites during a period when it receives information from four or more GPS satellites. The time synchronization may then be determined to be accurate for a predetermined period of time. Alternatively, time synchronization may be achieved by receiving aiding information from a transmitter other than another mobile device 310a–310c. That is, timing and synchronization information may be received from an external network in communication with one or more of the mobile devices 310a–310c. In another alternative, mobile devices 310a–310c may be able to derive a time reference used by the GPS satellites by combining information relating the relative positions of the mobile group members with the satellite pseudo ranges.

Each mobile device has four unknown variables that are typically needed to determine its position. The four unknown variables correspond to the three ranges needed to trilaterate to a position and the fourth range needed to resolve a timing error between a time reference used by the mobile devices 310a–310c and the time reference used by the GPS satellites. Because there are three devices, the total number of unknown variables is twelve. However, the GPS time reference is not an independent variable for each of the mobile devices 310a–310c. Once one of the mobile devices 310a–310c resolves the GPS time reference, the information can be shared with the other mobile devices in the local group. Thus, the local group of mobile devices 310a–310c only needs to resolve ten independent variables. Referring to FIG. 3, the ten independent variables are the three pseudo ranges for each of the three mobile devices 310a–310c and the GPS time reference.

Even if the GPS satellites 320a–320c, 330a–330c, and 340a–340c are not distinct satellites, the position of each mobile device 310a–310c may be determined. Each pseudorange from a unique mobile to a given satellite is treated as a unique range for the purposes of solving for position. If each mobile device 310a–310c is in communication with three distinct GPS satellites, the position of each mobile device 310a–310c may be determined by supplementing the GPS pseudo ranges with the mobile to mobile ranges between the different mobile devices. The duplication in GPS satellites among different mobile devices 310a–310c will not result in underdetermined position solutions. The position determination is underdetermined if there are fewer ranges than are required to determine an absolute position. The satellite pseudo range information determined by each mobile device 310a–310c is independent of the satellite pseudo range determined by a different mobile device 310a–310c.

In an alternative embodiment, a first mobile device 310a is in communication with three GPS satellites 320a–320c and a second mobile device 310b is in communication with three GPS satellites 330a–330b. At least one of the satellites 330a–330b in communication with the second mobile device 310b is different from the satellites 320a–320c in communication with the first mobile device 310a. Each of the mobile devices 310a–310c is also able to determine an angle of arrival of each of the satellite ranging signals. This information is shared between the two devices. Furthermore, the second mobile device 310b transmits a ranging signal to the first mobile device 310a and the first mobile device is able to determine a range and angle of arrival from the inter-mobile ranging signal. The first mobile device 310a may then be able to determine a pseudo range from a GPS satellite 330a–330c with which it is not in communication. The first mobile device 310a is then able to synchronize with GPS time, determine its absolute position, and share this information with the other members of the local group. Then the other mobile devices 310b–310c may also determine their absolute positions.

Figure 4:
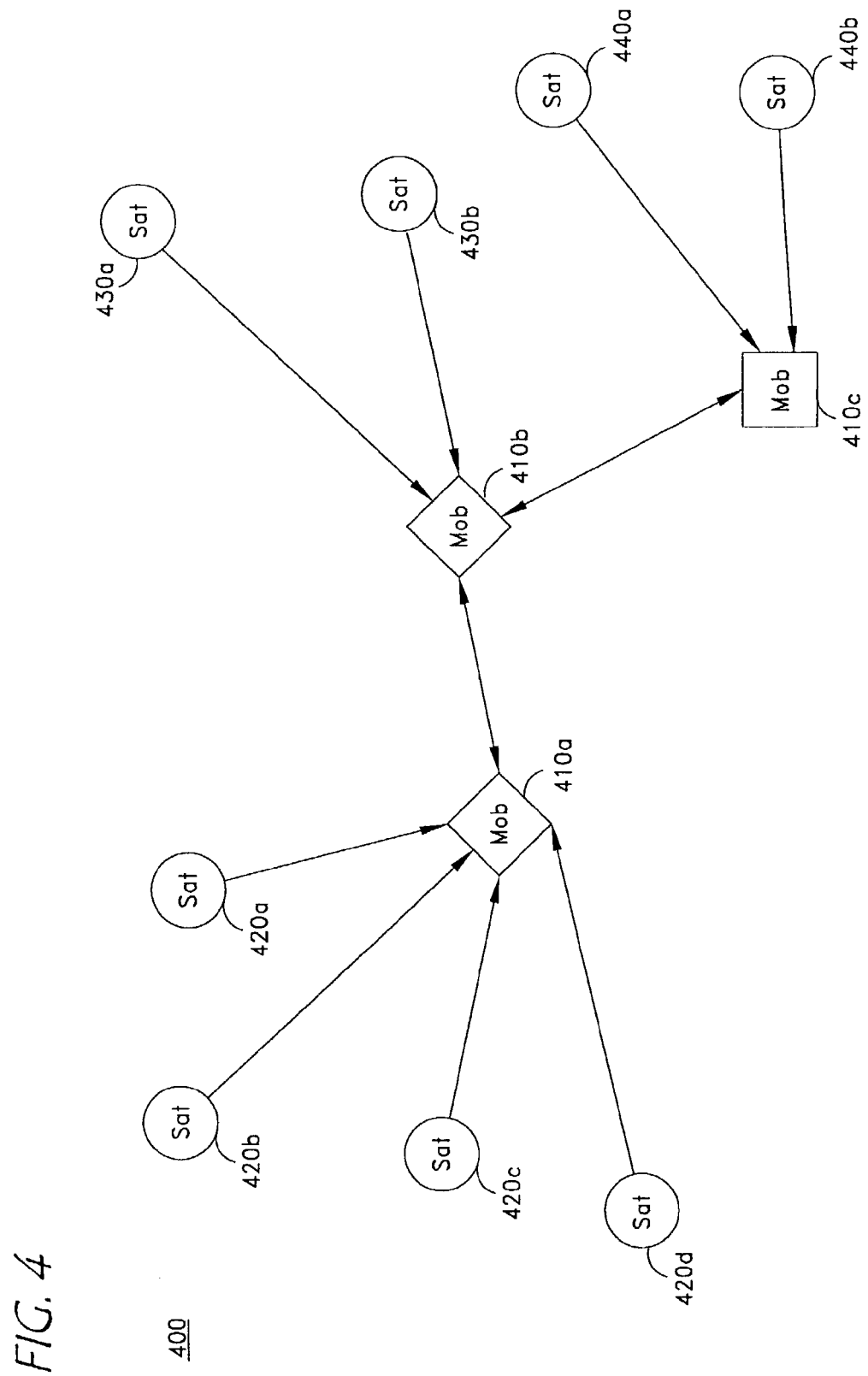
FIG. 4 is a functional diagram of one embodiment of a position determination system showing three mobile devices, with a first mobile device having access to four GPS satellites.

Another position location system 400 is shown in FIG. 4. Three mobile devices, 410a, 410b, and 410c are shown. The first mobile device 410a is in communication with four GPS satellites 420a–420d. The first mobile device 410b is also in communication with a second mobile device 410b. The second mobile device 410b is in communication with two GPS satellites 430a–430b. The second mobile device 410b is also in communication with the first mobile device 410a. The third mobile device 410c is in communication with two GPS satellites 440a–440b. The third mobile device 410c is also in communication with the second mobile device 410b.

In order to better illustrate the use of shared information, the third mobile device 410c is not in communication with the first mobile device 410a.

The position of the first mobile device 410a may be determined using the information from the four GPS satellites 420a–420d. The absolute position of the first mobile device 410a is determined because the first mobile device 410a is in communication with at least four GPS satellites. If the first mobile device 410a was in communication with more than four GPS satellites, its position would be overdetermined. The position is overdetermined when more ranges are available than are required to determine an absolute position.

The position may be overdetermined when ranges can be determined from more than four synchronized sources. The sources may be any absolute position references and do not need to be satellites. For example, a mobile device may be able to determine ranges to two GPS satellites and three absolute position references that are synchronized to GPS time.

An overdetermined position determination is typically more accurate than position determined using precisely the number of ranges required to absolutely determine position. The more accurate position determination may be due to reduction in geometric dilution of precision (GDOP), further hypothesis testing, or some other factor.

Returning to FIG. 4, the second mobile device 410b is unable to determine its position using only GPS satellite information because the second mobile device 410b is only in communication with two GPS satellites 430a–430b. However, the first mobile device 410a may share information with the second mobile device 410b. Additionally, the second mobile device 410b may determine a range to the first mobile device 410a. Each of the mobile devices 410a–410b needs to determine four unknowns to calculate its position location. These unknowns are three ranges for triangulation and a fourth for time synchronization. However, because the GPS time reference is common for both mobile devices 410a–410b, the information can be shared. Thus, the GPS time reference only needs to be determined once and does not represent two independent variables as it would if the mobile devices 410a–410b could not share information.

The first and second mobile devices 410a–410b are able to determine their absolute positions because the first mobile device 410a can determine the four ranges to the four GPS satellites 420a–420d with which it is in communication. In addition, the second mobile device 410b can determine two ranges to the two GPS satellites 430a–430c with which it is in communication. Additionally, the first and second mobile devices 410a–410b can determine a mobile to mobile range between themselves. The first and second mobile devices 410a–410b can also share timing information.

As an example, the first mobile device 410a is able to determine its position using four ranges that are determined using information transmitted by each of four GPS satellites 420a–420d. The first mobile device 410a can use any additional GPS satellite (not shown) with which it is in communication in order to improve the accuracy of its position determination.

The second mobile device 410b is in communication with two GPS satellites 430a–430b. These two GPS satellites do not themselves provide sufficient information for the second mobile device 410b to determine its position. However, the second mobile device 410b is in communication with the first mobile device 410a. The first mobile device 410a shares information with the second mobile device 410b. For example, the first mobile device 410a may provide its absolute location and GPS timing information to the second mobile device 410b. Additionally, the first mobile device may transmit a ranging signal to the second mobile device 410b that allows the second mobile device 410b to determine its range from the first mobile device 410a. Using the shared information and the range to the first mobile device 410a, the second mobile device 410b now has available two ranges to the two GPS satellites 430a–430b, GPS timing information, and a range to the first mobile device 410a. Because the position of the first mobile device 410a is known, the second mobile device 410b is able to determine its position based on three ranges to known positions, and a timing reference that allows the second mobile device 410b to synchronize an internal time reference to transmitted ranging signals. Inaccuracies in the position determination of the first mobile device 410a propagate to the location of the second mobile device 410b. That is, because the second mobile device 410b determines its position in part based on the position of the first mobile device 410a, inaccuracies in the location of the first mobile device 410a affect the accuracy of the position determination of the second mobile device 410b.

Similarly, the third mobile device 410c may determine its absolute position. The third mobile device 410c is in communication with two GPS satellites 440a–440b. However, the two pseudo ranges that can be determined from the two GPS satellites 440a–440b are not sufficient to determine the absolute position of the third mobile device 410c. If the third mobile device 410c were able to communicate with the first mobile device 410a, the position of the third mobile device 410c could be determined in a manner analogous to that used by the second mobile device 410b. However, the third mobile device 410c is only in communication with the second mobile device 410b.

The second and third mobile devices 410b and 410c are unable to determine their absolute positions without some additional information. As noted above, the second mobile device 410b can determine its absolute position by sharing information with the first mobile device 410a.

The third mobile device 410c is able to determine its absolute position once the second mobile device 410b is able to determine its absolute position. When the absolute position of the second mobile device 410b is known, the third mobile device can determine two ranges to two GPS satellites 440a–440b and can determine a range to the second mobile device 410b. Additionally, the second mobile device 410b can share GPS timing information with the third mobile device 410c. Thus, by using shared information, the third mobile device 410c is able to determine ranges to three absolute positions, and a timing reference to which the three signal sources are synchronized. Thus, the third mobile device 410c is able to determine its absolute position.

It should be noted that the third mobile device 410c is unable to determine its absolute position until the second mobile device 410b has determined its absolute position. Thus, the information from the first mobile device 410a is effectively shared with the third mobile device 410c with which there is no direct communication. In this manner, absolute position may be determined serially. Remote mobile devices having no access to GPS satellites may be able to determine their absolute position based on shared information.

Figure 5:
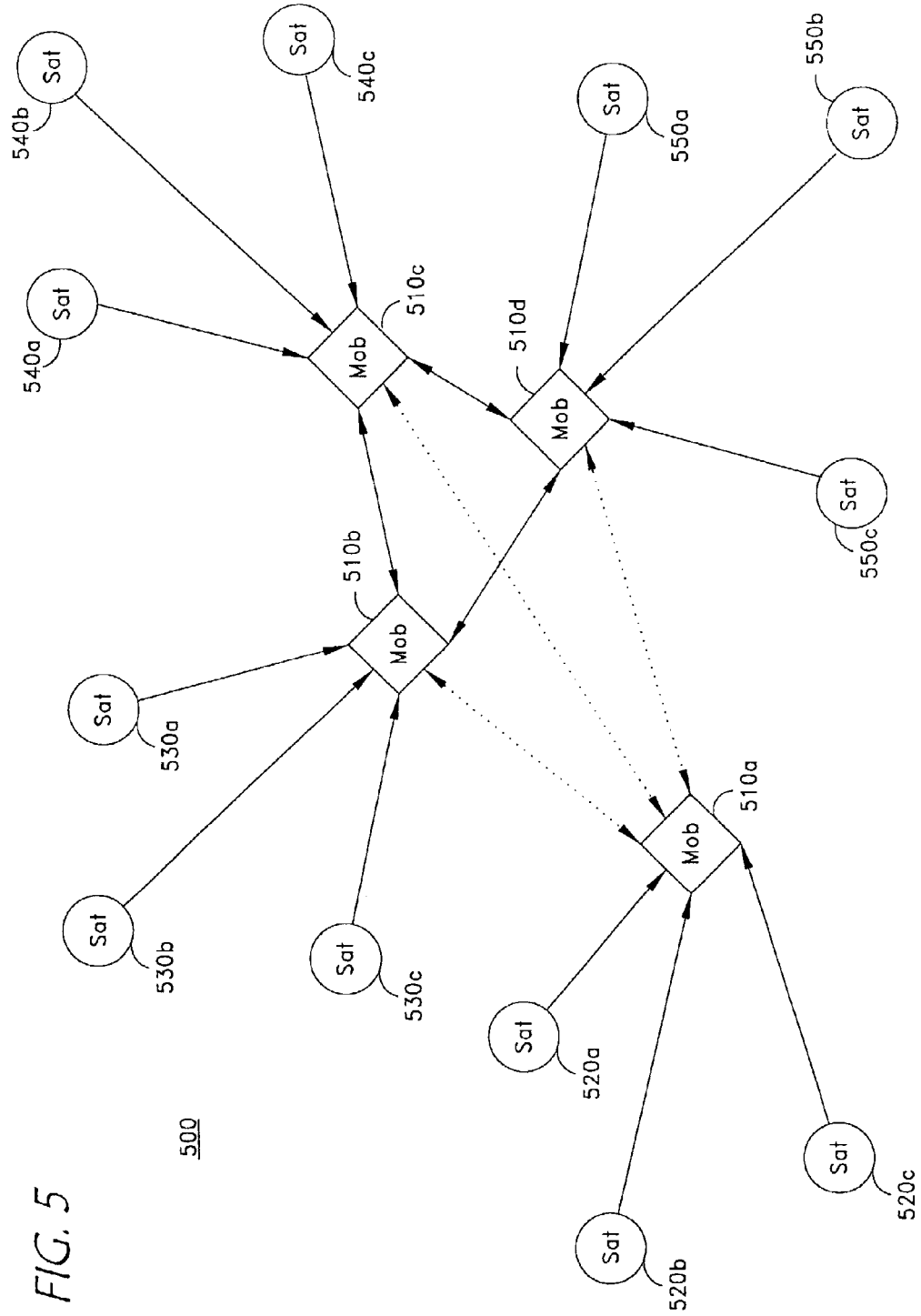
FIG. 5 is a functional block diagram of one embodiment of a position determination system generalized for multiple mobile devices.

A generalized multiple mobile device position location system 500 is shown in FIG. 5. The figure shows a mobile device 510a in communication with three GPS satellites 520a–520c. The mobile device 510a is also in communication with a three mobile device group, such as the one described above in relation to FIG. 3. Each of the mobile devices 510b–510c in the three mobile device group communicates with three GPS satellites, 530a–530c, 540a–540c, and 550a–550c, respectively. Additionally, each of the mobile devices 510a–510d communicates with each of the other mobile devices.

The manner in which a three mobile device group can determine the position of each of the mobile devices 510b–510c was discussed earlier. In FIG. 5, the fourth mobile device 510a has available at least three additional ranges. These three additional ranges are determined using the communication to each of the other mobile devices 510b–510c. In addition, the fourth mobile device 510a can determine three ranges to the GPS satellites 520a–520c from which it is receiving transmissions. Although the fourth mobile device 510a needs four ranges to accurately determine its position, it has available six possible ranges, three from the GPS satellites 520a–520c and one from each of the three other mobile devices 510b–510d. Thus, the fourth mobile device 510a may communicate with only one GPS satellite, for example 520a, and still be able to determine its position. Alternatively, the fourth mobile device 510a may use three ranges to the GPS satellites 520a–520c and may receive GPS timing information directly from one of the other mobile devices in the local group.

The multiple mobile embodiment 500 may be generalized to n mobile devices. The nth mobile device contributes n-1 additional ranges to the mobile device group. The n-1 additional ranges are the ranges from the nth mobile device to the n-1 mobile devices. The position of the nth mobile device may be determined provided the nth mobile device can determine four distinct ranges. Alternatively, the position of the nth mobile device may be determined if the nth mobile device is able to determine three distinct ranges and a time reference. Any additional ranges or satellite information provided by the nth mobile may be shared by the local group to supplement inadequate ranges of other members of the group. The additional information may also be shared with the group in order to increase the position accuracy of each of the group members.

Figure 6:
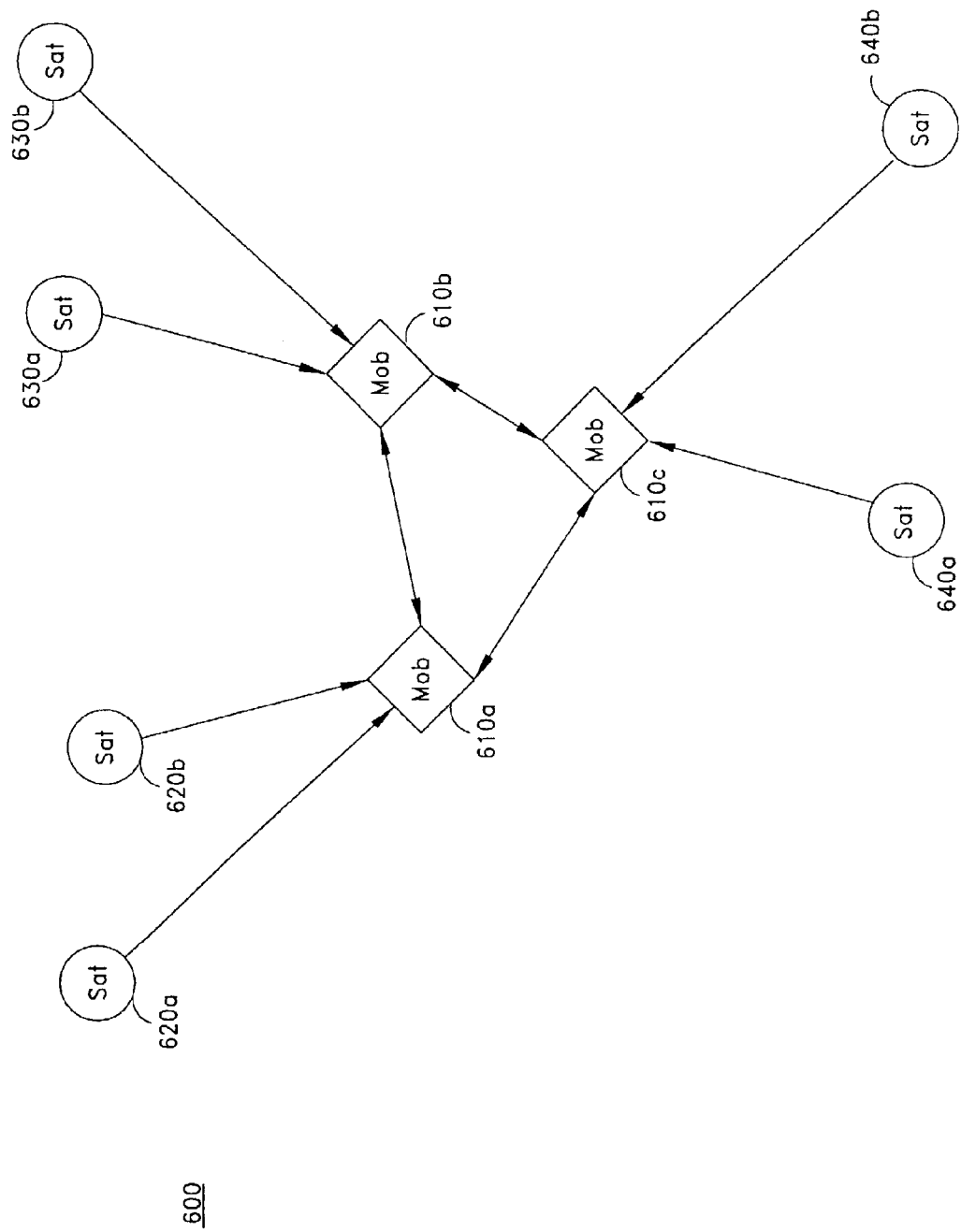
FIG. 6 is a functional diagram of one embodiment of a position determination system showing a common fix for a group of mobile devices.

FIG. 6 shows an embodiment 600 where there are insufficient numbers of ranges to determine the position of each mobile device individually, but a common fix for the mobile device group may be determined. Three mobile devices 610a–610c are in communication with each other in a local group of mobile devices.

A first mobile device 610a is in communication with two GPS satellites 620a–620b. The first communication device is also in communication with a second mobile device 610b and a third mobile device 610c. The second mobile device 610b is in communication with two GPS satellites 630a–630b and the other two mobile devices 610a and 610c in the local group. Similarly, the third mobile device 610c is in communication with two GPS satellites 640a–640b and the other two mobile devices 610a–610b in the local group.

The mobile devices 610a–610c in this local group can share ranging information between members of the group in order to obtain a sufficient number of ranges to obtain a position determination for the group. In order to determine a position of the local group, the members of the local group need at least four measurements to emitters with known locations. Thus, in the embodiment 600 of FIG. 6, it is desirable for the local group to be in communication with at least four different GPS satellites. Any other satellites for which the members of the local group are in communication may be used to increase the accuracy of the position determination. For example, the first mobile device 610a is in communication with two GPS satellites 620a and 620b. Thus, the first mobile device 610a can determine two pseudo ranges corresponding to the two GPS satellites 620a–620b. The first mobile device 610a can also determine its position relative to the second mobile device 610b and the third mobile device 610c by determining the range to each of the other two mobile devices 610b–610c. The first mobile device 610a can also share satellite ranging information with the other two mobile devices 610b–610c. Thus, the first mobile device 610a can obtain the GPS satellite information from the second mobile device 610b or the third mobile device 610c. The first mobile device 610a can then determine the position of the local group using the shared satellite information and the mobile to mobile ranging information. The common position of the local group can then be communicated to all members of the local group.

Of course, the mobile devices do not need to determine ranging information from GPS satellites. One or all of the mobile devices 610a–610c may determine ranging information to some other transmitter having a known location. For example, ranging information may be determined from wireless base stations. A mobile device may, for example, determine a pseudo range to a wireless base station based on a pilot phase.

A common position for the local group may be determined solely on the information from GPS satellites. Similarly, the common position for the local group may be determined solely on information from other location sources, such as wireless base stations. Additionally, a common fix for the local group may be determined based on a combination of positional information determined from multiple sources. The shared information may include ranging information as well as timing information. Alternatively, the timing information may be considered one aspect of ranging information. The timing information may include GPS timing or a wireless system reference time. For example, ranging information may be determined from GPS satellites and also from wireless base stations. A particular mobile device may be in communication with GPS satellites, wireless base stations, or both. The ranging information may then be shared among the members of the local group to determine a common position.

Figure 7:
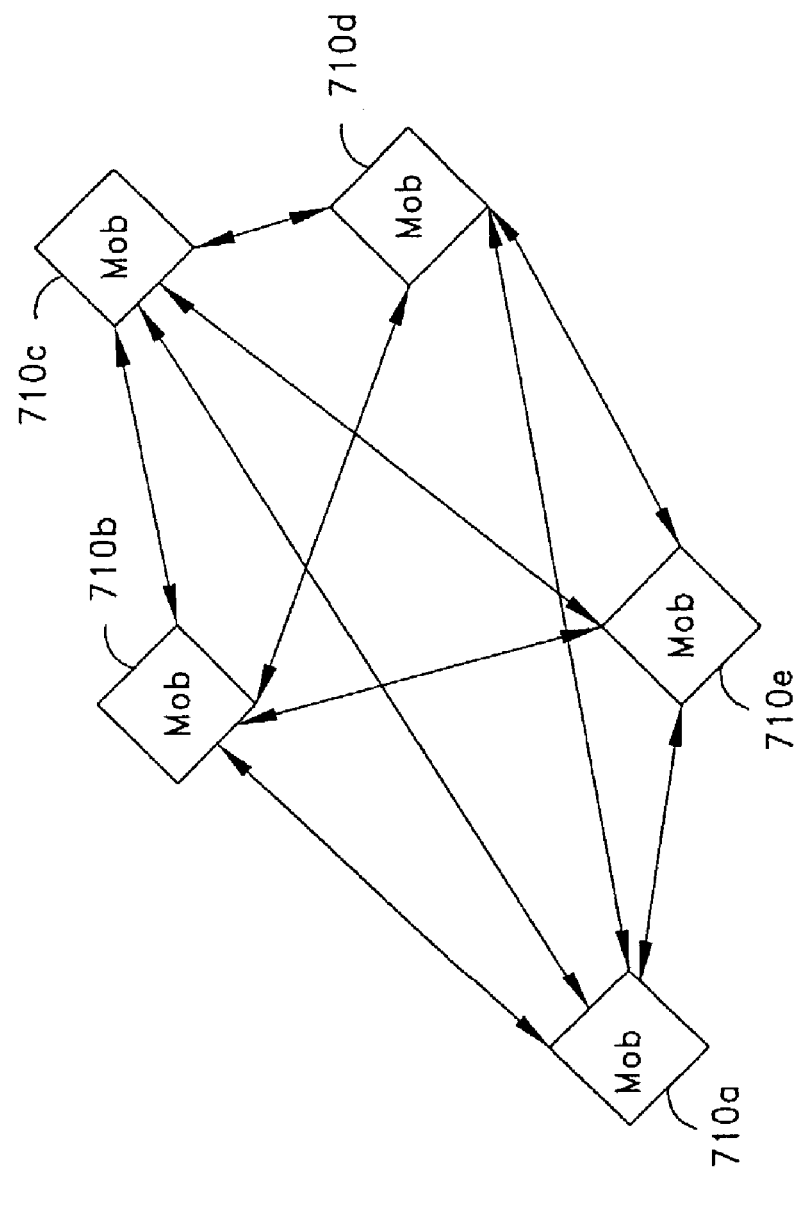
FIG. 7 is a functional diagram of one embodiment of a position determination system showing relative positioning for a group of mobile devices.

FIG. 7 shows a position determination embodiment 700 where the number of satellite ranges are inadequate to achieve even a common fix for a local group comprising a number of mobile devices 710a–710e. However, if there are a sufficient number of members in the local group, each member of the local group can determine its position relative to the other members of the group.

Each of the mobile devices 710a–710e may communicate with all other members of the local group. Additionally, each of the mobile devices 710a–710e transmits a signal that may be used by the other members of the local group for ranging. Each of the mobile devices may also be able to determine an angle of arrival of the ranging signals transmitted by the other members of the local group. Timing information may be shared to time synchronize all members of the local group. Time synchronization ensures that mobile to mobile ranges are accurately determined. The ranging signals are received by each mobile device 710a–710e and may be used to determine a relative position.

As an example, the first mobile device 710a receives ranging signals transmitted by each of the other mobile devices 710b–710e in the local group. The first mobile device 710a determines a range corresponding to each of the transmitted ranging signals. Additionally, the first mobile device 710*a* may incorporate a digital compass or some other means for determining direction or angle of arrival. The first mobile device 710*a* may triangulate its position relative to the other mobile devices 710*b*–710*c* using three of the ranges, and may use the fourth range to resolve a timing inaccuracy or to otherwise further improve the relative position location. Only three ranges are typically required to determine a relative position because all of the members in the local group can be time synchronized. As noted above, additional ranges may be used to further improve the accuracy of the location. The additional ranges may compensate for GDOP, timing errors, multipath, or other sources of error. Note that the first mobile unit 710*a* is unable to determine its absolute position because the absolute position is not known for the ranging signal transmitters.

Relative positioning of the members of a local group may be of more interest than the absolute position of each of the group members. For example, in an environment such as a encountered by a fire brigade fighting a fire, the ability of each member to locate another may be impaired by smoke and fire. Each member of the fire brigade may be equipped with a two-way radio that may transmit and receive signals to each of the other members of the fire brigade. The various two-way radios then define a local group. Each radio may then transmit ranging signals to each of the other members of the local group. Each radio can also receive ranging signals transmitted by members of the local group. Additionally, a ranging signal may be transmitted from a beacon, such as one placed at the location of a fire truck, fire hydrant, or other location. Each member of the fire brigade may then know its position relative to the other members and the transmitting beacons if a sufficient number of ranging signals can be received.

Figure 8A:
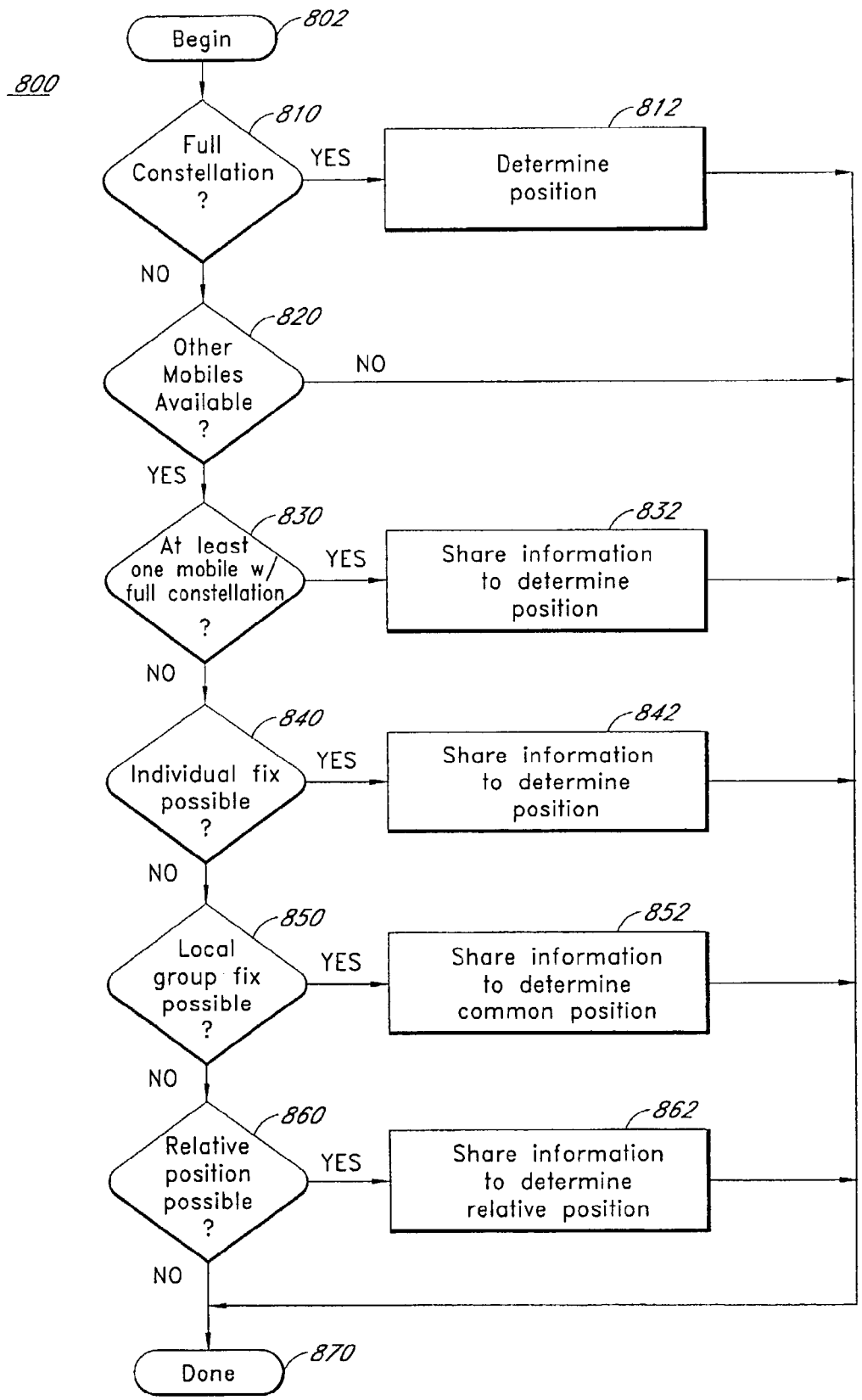
FIGS. 8A–8B are flow charts showing a method used in one embodiment of a hybrid position determination system.

One embodiment of a method 800 of position determination using a hybrid position determination system is shown in FIG. 8A. The method 800 begins 802 when the routine is initialized. The method 800 may operate in a continuous loop within a mobile device or may be scheduled to operate according to a schedule. Alternatively, the method 800 may operate in response to user input or may operate in response to a remote signal. In one embodiment, the method is implemented in software or firmware, and stored within the position determination module 238 (FIG. 2).

The method 800 initially checks to see if a full constellation is available from a first position determination sub-system. Here the term full constellation refers to a number of position location signal sources sufficient for the mobile device to determine its position. For example, if the first position location sub-system is GPS, the mobile station has a full constellation available if it can receive signals from four GPS satellites.

If a full constellation is available to the mobile device or other apparatus running the method 800, the method proceeds to decision block 802 wherein the position of the mobile device is determined using the signals from the full constellation. Once the position of the mobile device is determined, the method 800 is done and moves to an end block 870.

If a full constellation is not available to the mobile device, the method proceeds to decision block 820 where the method checks to see if signals from any other mobiles are available. Although decision block 820 queries whether other mobile devices are available, the signals searched by the method may include signals from other position location sources, beacons, fixed signal sources, or any other signal source which may be used as a position location signal source.

If no other mobile devices are available, the method 800 proceeds to block 870 where it is terminated. Because no other mobile devices are available, the method does not have any signal sources which it can use to supplement the incomplete constellation from the first position location sub-system.

If signals from other mobile devices are available, the mobile devices that are able to communicate position location information with each other define a local group. The method 800 proceeds to decision block 830 to verify whether any other mobile device has a full constellation available. That is, the method checks to see if any of the other mobile devices can determine their position using the first position location sub-system.

If at least one other mobile device is in communication with a full constellation or otherwise is able to determine its absolute position, the method 800 proceeds to block 832 to attempt to determine its position by sharing information with other mobile devices.

An example of a situation where a mobile device may determine its position by sharing information with another mobile device having a known location is provided above with respect to FIG. 4. Once the method determines the position of the mobile device, it is done.

If no mobile device in the local group communicates with a full constellation of GPS satellites, the method 800 proceeds to decision block 840 where the method determines whether an individual fix of the mobile device position is possible. The ability of the mobile device to determine its absolute position is based on a number of factors. These factors include, but are not limited to, the number of GPS satellites with which each local group member is in communication, the number of members in the local group, and the ability of a receiving mobile device to triangulate its position based on the ranging signals transmitted by the other mobile devices. A mobile device can determine its position even if it communicates with no GPS satellites if a sufficient number of members in the local group can determine their respective positions. As discussed above with respect to FIG. 3, three mobile devices in a local group can each determine their positions although each mobile device is in communication with only three GPS satellites.

In decision block 840, the method 800 determines whether an individual fix is possible by communicating with the other members of the local group and sharing position location and aiding information. If it is determined that an individual fix is possible, the method proceeds to block 842 where the position of the mobile device is determined using the shared information. If an individual fix is not possible, the method proceeds to decision block 850.

In decision block 850, the method determines if a fix of the local group is possible. The common fix embodiment is discussed above in relation to FIG. 6. Although a common fix for a local group is less accurate than an individual absolute fix for each member of the local group, the signals required to obtain a local fix are minimal. If a common fix for the local group is possible, the method proceeds to block 852 to determine the common fix using the shared position information from the members of the local group. Once the common fix is determined, the method 800 is done and terminates at the end block 870.

If the members of the local group do not have sufficient position location information for even the determination of a common fix, the method proceeds to decision block 860. In decision block 860, the method determines if there are enough members in the local group to determine the relative positions of the members of the local group. The ability to determine relative positioning is based in part on the number of members in the local group. The higher the number of members in the local group the higher the probability that a mobile device will be able to initially determine a position relative to at least some of the members of the local group.

If relative position determination is possible, the method proceeds to block 862 where the position of the mobile device is determined relative to at least some of the other members of the local group. The relative position of the mobile device can then be shared with other members of the local group such that the position of the mobile device relative to all members of the local group may be determined. Information is shared among the members of the local group. The shared information may include ranging information, timing information, and position information. Once the position of the mobile device relative to other members of the local group is determined, the method is done. Additionally, if, in block 860, it is determined that the position of the mobile device relative to other members of the local group cannot be determined, the method is done at an end block 870.

A device implementing the method 800 need not check for every position determination possibility. The device may integrate only those position determination functions for which it desires. For example, a device may choose to only incorporate the absolute position determination functions. Alternatively, a device may choose to incorporate only the relative position determination functions. In another alternative, the various position determination functions may be implemented as separate methods, each scheduled to operate according to a different time schedule or triggering event.

Figure 8B:
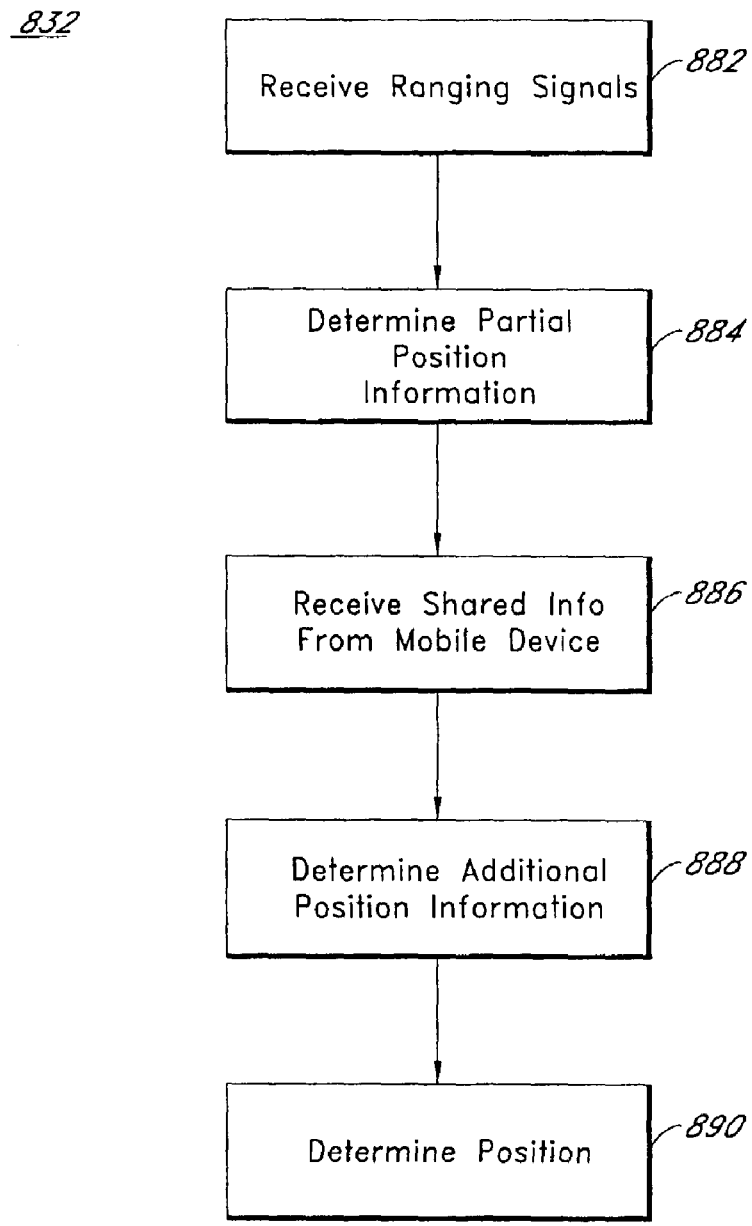

FIG. 8B shows an embodiment of block 832 from FIG. 8A. The method shown in FIG. 8B shows how shared information can be used to determine the position of the mobile device. For example, a mobile device may be able to receive signals from two GPS satellites and which is in communication with a second mobile device that is in communication with four GPS satellites. The mobile device could use the method of FIG. 8B to determine its position.

In block 882, the method begins by receiving ranging signals. The ranging signals may, for example, be the signals transmitted by one or more GPS satellites. Although the flowchart shows the receipt of ranging signals, other position information may be received instead of, or in addition to, ranging signals.

The method next advances to block 884. In block 884, the method determines partial position information from the received signals. When the received signals are GPS satellite transmissions, the method in block 884 may determine the range to each of the GPS satellites. After determining the partial position information, the mehtod proceeds to block 886.

In block 886, the mobile device running the method receives shared information from the second mobile device. The shared information may, for example, be a mobile to mobile ranging signal. The shared information may also be GPS timing information and the position of the second mobile device.

The method next proceeds to block 888 where the method determines additional position information using the shared information. The additional information may include the mobile to mobile range. Once the additional position information is determined, the method proceeds to block 890, where the method determines the position of the mobile device using at least the partial position information and the additional position information determined from the shared information.

A mobile device implementing the method may determine its position internally in a position determination module, or may transmit some or all of the position information to a remote location where the mobile device's position is determined. The position can then be transmitted back to the mobile device.

Figure 9:
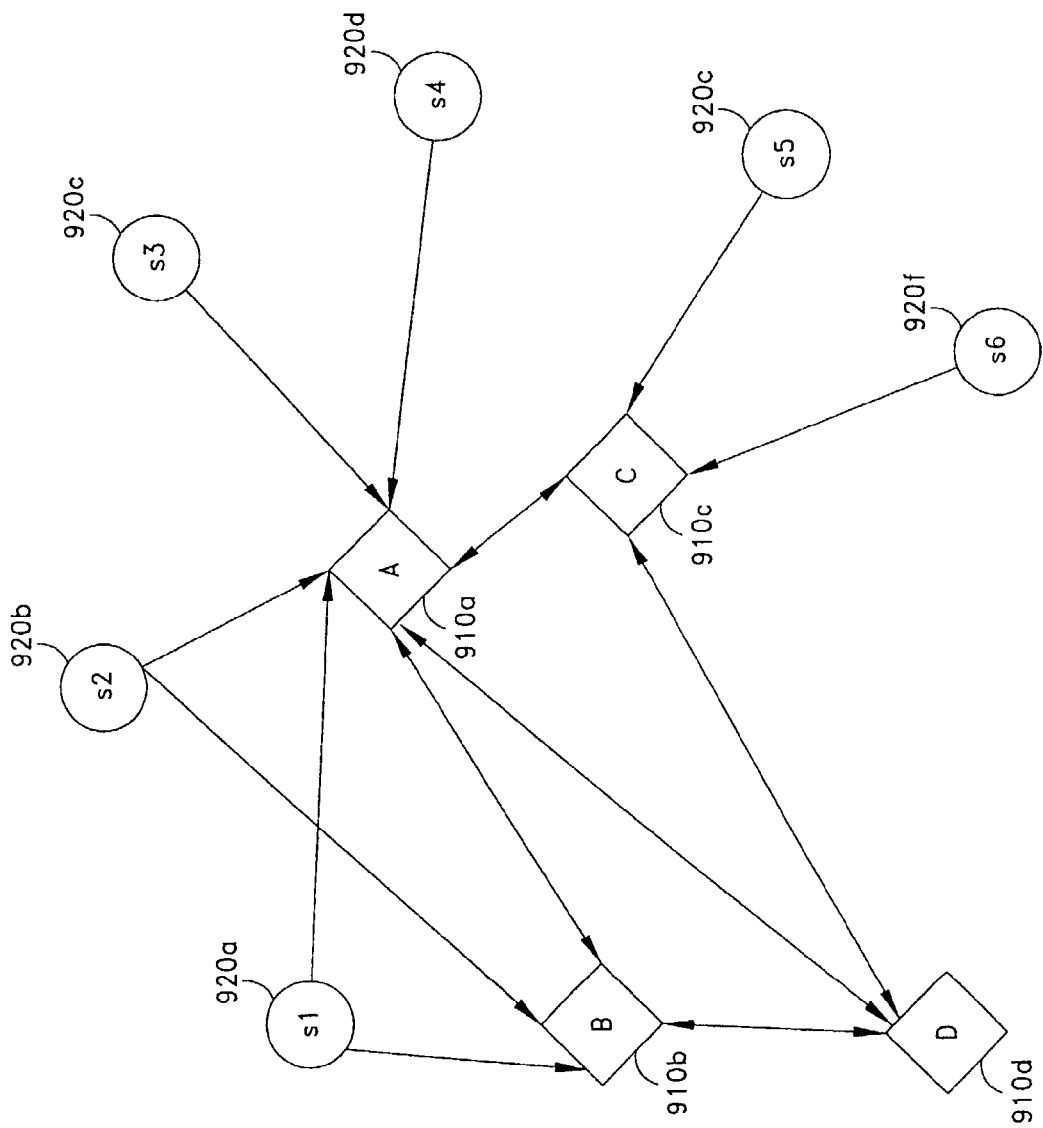
FIG. 9 is a functional diagram of one embodiment of a position determination system showing application of a position determination method disclosed herein.

An example of a group of mobile devices 910a–910d that incorporates one embodiment of a position determination system which implements the method 800 to determine their absolute positions is shown in FIG. 9. Four mobile devices 910a–910d are in communication with each other. The four mobile devices 910a–910d define a local group. A first mobile device 910a receives transmissions from four GPS satellites 920a–920d. A second mobile device 910b receives GPS transmissions from two GPS satellites 920a–920b. A third mobile device 910c receives transmissions from two GPS satellites 920e–920f. A fourth mobile device 910d does not receive any GPS satellite transmissions.

The first mobile device 910a receives transmissions from a full constellation of GPS satellites. That is, the first mobile device 910a receives transmissions from a sufficient number of GPS satellites to make an absolute position determination. Thus, the first mobile device 910a can determine its absolute position and can determine a GPS time reference.

The second mobile device 910b does not communicate with a full constellation of GPS satellites. The second mobile device 910b receives transmissions from only two GPS satellites 920a–920b and is unable to make an absolute position determination based on the two GPS transmissions. However, the second mobile device 910b is in communication with the first mobile device 910a. The first mobile device 910a receives transmissions from a full constellation and is able to determine its absolute position. It does not matter that the first and second mobile devices, 910a–910b, share two GPS satellites 920a–920b.

Thus, the first and second mobile devices 910a–910b share information to allow the second mobile device 910b to determine its absolute position. The first mobile device 910a transmits its absolute position and a GPS time reference to the second mobile device 910b. The first mobile device 910a also transmits a ranging signal. The second mobile device 910b uses the ranging signal to determine the mobile to mobile range between the first and second mobile devices, 910a and 910b. The second mobile device 910b now has three ranges to known locations, and a time reference to which all transmitters are synchronized. The second mobile device 910b is able to determine its absolute position using this information.

The third mobile device 910c can determine its absolute position using the same method as was used by the second mobile device 910b. The third mobile device 910c receives transmissions from only two GPS satellites 920e and 920f. However, the third mobile device 910c communicates with the first mobile device 910a and the first mobile device 910a receives transmissions from a full constellation. The third mobile device 910c can determine the ranges to two GPS satellites 920e–920f. The third mobile device 910c also receives the GPS time reference from the first mobile device 910a. The third mobile device 910c also determines the range to the first mobile device 910a using the ranging signal transmitted by the first mobile device 910a. The third mobile device 910c uses the three ranges and the GPS time reference to determine its absolute position.

The fourth mobile device 910d does not receive transmissions from any GPS satellites. However, the fourth mobile device 910d is still able to determine its absolute position because it is in communication with three other mobile devices 910a–910c having known positions. Each of the first, second, and third mobile devices 910a–910c transmits its absolute position to the fourth mobile device 910d. Each of the first, second, and third mobile devices 910a–910c also transmits a ranging signal. The fourth mobile device 910d receives each of the ranging signals and determines a mobile to mobile range between the fourth mobile device 910d and each of the other mobile devices 910a–910c in the local group. The fourth mobile device 910d also receives a time reference from one of the members of the local group. The fourth mobile device 910d is able to determine its absolute position using the three ranges to known locations and the time reference. Thus, although the fourth mobile device 910d does not receive transmissions from any GPS satellites, it is able to determine its absolute position by sharing information with other devices.

Thus, a method and device have been described where a mobile device may determine its position using partial position information from a first position determination sub-system and additional position information from other mobile devices. The various embodiments have generally described the first position determination subsystem as GPS. However, the first position determination sub-system may be GPS, Global Orbiting Navigation Satellite System (GLONASS), a terrestrial based position location system, a system of Location measurement Units (LMU), a wireless communication system, a hybrid position location system, a combination of position location systems, or any system capable of providing information to the mobile device such that the mobile device may determine its position.

The various embodiments have also referred to position determination of a mobile device. However, while position determination is generally of more concern for mobile devices, the position determination device and method disclosed herein may be implemented in a mobile device, a fixed location device, a portable device, or any device for which position determination is desired. When the device is a mobile device, the mobile device may be a wireless phone, a two-way radio, a personal digital assistant with wireless access, a notebook computer with wireless access, a walkie-talkie, a cordless telephone, or any other device that can implement the method described herein.

Additionally, the various members of a local group have been described as mobile devices, however a device may determine its position using communication with other mobile devices, beacons, transmitters, networks, or fixed location devices. Additionally, the mobile device may determine its position using an internal processor or may determine its position using a network or other device with which it is in communication. The position determination is not limited to mobile-based position determination, but rather may encompass distributed position determination where the mobile device performs a portion of the position determination and another portion of the position determination is determined by another device in communication with the mobile device. An example of distributed position determination is network based position determination where a network in communication with the mobile device provides the mobile device aiding information to allow the mobile device to quickly acquire GPS satellite signals. The pseudo ranges or time offsets determined by the mobile device may then be transmitted to the network. The network may include a position location server that determines the actual position of the mobile device. The position may then be communicated to the mobile device.

Communication with the mobile device may be direct communication where the mobile device transmits and receives signals directly to another device. Alternatively, communication with the mobile device may be indirect. The mobile device may communicate with a base station, network, or other device. Another device may communicate with the base station, network, or other device when communicating with the mobile device.

Electrical connections, couplings, and connections have been described with respect to various devices or elements. The connections and couplings may be direct or indirect. A connection between a first and second electrical device may be a direct electrical connection or may be an indirect electrical connection. An indirect electrical connection may include interposed elements that may process the signals from the first electrical device to the second electrical device.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a mobile device, base station, or base station controller. In the alternative, the processor and the storage medium may reside as discrete components in a mobile device, base station, or base station controller.

The above description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A method for determining a position of a first mobile station, comprising:
   receiving from a second mobile station having an underdetermined position determination, shared information from which range information related to a range between the first mobile station and a second mobile station can be determined;
   determining the range information from said shared information;
   receiving at said first mobile station first position location signals;
   receiving from said second mobile station at said first mobile station shared second position location signals;
   and determining the position of said first mobile station using said first and second position location signals and said range information.

2. The method of claim 1 wherein said receiving shared information comprises receiving at said first mobile station a PRN code sequence sent by said second mobile station.

3. The method of claim 1 further comprising receiving at said first mobile station shared timing information sent from said second mobile station.

4. The method of claim 1 further comprising receiving a time reference signal at said first mobile device from said second mobile device, and synchronizing a time base between said first and second mobile devices from said received time reference signal.

5. The method of claim 1 wherein said determining the range information comprises synchronizing a time base of said first mobile station to a time base of said second mobile station, and receiving at said first mobile station a PRN code sequence transmitted by said second mobile station.

6. The method of claim 1 wherein said receiving at said first mobile station first position location signals comprises receiving at least some GPS location information transmitted by respective GPS satellites.

7. The method of claim 1 wherein said receiving at said first mobile station first position location signals comprises receiving at least some location information from a base station in a wireless network in which at least said first mobile station is operating.

8. The method of claim 1 wherein said receiving at said first mobile station second position location signals comprises receiving at lean some GPS location information transmitted by respective GPS satellites received by said second mobile station and transmitted to said first mobile station.

9. The method of claim 1 wherein said receiving at said first mobile station second position location signals comprises receiving at least some location information from a base station in a wireless network in which at least said second mobile station is operating.

10. The method of claim 1 wherein at least three position location signals are used to determine the position of said first mobile station.

11. A method for determining a position of a first mobile station, comprising:
    synchronizing a time base of said first mobile station to a time base of a second mobile station, the second mobile station having an underdetermined position determination;
    receiving at said first mobile station a PRN code sequence transmitted by said second mobile station;
    determining range information related to a range between said first and second mobile stations using said time base and said received PRN code sequence;
    receiving at said first mobile station first position location signals;
    receiving from said second mobile station at said first mobile station shared second position location signals;
    and determining the position of said first mobile station using said first and second position location signals and said range information.

12. The method of claim 11 wherein said receiving at said first mobile station first position location signals comprises receiving at least some GPS location information transmitted by respective GPS satellites.

13. The method of claim 11 wherein said receiving at said first mobile station first position location signals comprises receiving at least some location information from a base station in a wireless network in which at least said first mobile station is operating.

14. The method of claim 11 wherein said receiving at said first mobile station second position location signals comprises receiving at least some GPS location information transmitted by respective GPS satellites received by said second mobile station and transmitted to said first mobile station.

15. The method of claim 11 wherein said receiving ax said first mobile station second position location signals comprises receiving at least some location information from a base station in a wireless network in which at least said second mobile station is operating.

16. The method of claim 11 wherein at least four position location signals me used to determine the position of said first mobile station.

17. A method for determining a position of a first mobile station, comprising:
    sharing a time base between said first mobile station and a second mobile station, the second mobile station having an underdetermined position determination;
    receiving at said first mobile station first position location signals;
    receiving from said second mobile station at said first mobile station shared second position location signals;
    and determining the position of said first mobile station using said first and second position location signals and said shared time base.

18. The method of claim 17 wherein said receiving at said first mobile station first position location signals comprises receiving at least some GPS location information transmitted by respective GPS satellites.

19. The method of claim 17 wherein said receiving at said first mobile station first position location signals comprises receiving at least some location information from a base station in a wireless network in which at least said first mobile station is operating.

20. The method of claim 17 wherein said receiving at said first mobile station second position location signals comprises receiving at least some GPS location information transmitted by respective GPS satellites received by said second mobile station and transmitted to said first mobile station.

21. The method of claim 17 wherein said receiving at said first mobile station second position location signals comprises receiving at least some location information from a base station in a wireless network in which at least said second mobile station is operating.

22. The method of claim 17 wherein at least three position location signals are used to determine the position of said first mobile station.

23. A system for determining a position of a first mobile station, comprising:
- a receiver for receiving shared information from which range information related to a range between the first mobile station and a second mobile station having an underdetermined position determination can be determined;
- a first system for determining the range information;
- a receiver at said first mobile station for receiving first position location signals;
- a receiver for receiving from said second mobile station shared second position location signals;
- and a second system for determining the position of said first mobile station using said first and second position location signals and said range information.

24. The system of claim 23 wherein said shared information comprises a PRN code sequence transmitted by said second mobile station.

25. The system of claim 23 further comprising a receiver for receiving shared timing information sent from said second mobile station.

26. The system of claim 23 further comprising a receiver for receiving a time reference signal at said first mobile device from said second mobile device, and means for synchronizing a time base between said first and second mobile devices from said received time reference signal.

27. The system of claim 23 wherein said first system comprises means for synchronizing a time base of said first mobile station to a time base of said second mobile station, and a receiver for receiving at said first mobile station a PRN code sequence transmitted by said second mobile station.

28. The system of claim 23 wherein said receiver for receiving at said first mobile station first position location signals comprises a receiver for receiving at least some GPS location information transmitted by respective GPS satellites.

29. The system of claim 23 wherein said receiver for receiving at said first mobile station first position location signals comprises a receiver for receiving at least some location information from a base station in a wireless network in which at least said first mobile station is operating.

30. The system of claim 23 wherein said receiver for receiving at said first mobile station second position location signals comprises a receiver for receiving at least some GPS location information transmitted by respective GPS satellites received by said second mobile station and transmitted to said first mobile station.

31. The method of claim 23 wherein said receiving at said first mobile station second position location signals comprises receiving at least some location information from a base station in a wireless network in which at least said second mobile station is operating.

32. The system of claim 23 wherein said second system determines the position of said first mobile station using at least three position location signals.

* * * * *